United States Patent [19]

Neumann

[11] 3,991,957

[45] Nov. 16, 1976

[54] TURNOUT LANDING GEAR ARRAY CARRIER FOR HIGH-WING AIRCRAFT

[75] Inventor: Frank D. Neumann, Bellevue, Wash.

[73] Assignee: The Boeing Company, Seattle, Wash.

[22] Filed: Oct. 6, 1975

[21] Appl. No.: 620,235

Related U.S. Application Data

[63] Continuation of Ser. No. 451,947, March 18, 1974, abandoned.

[52] U.S. Cl. .............................. 244/102 R; 244/120
[51] Int. Cl.² ......................................... B64C 25/16
[58] Field of Search ............ 244/100 R, 101, 102 R, 244/10 S, 103 R, 103 W, 46, 49, 45 R, 50, 120; 74/11; 33/134; 198/165; 193/37

[56] References Cited

UNITED STATES PATENTS

| 1,503,297 | 7/1924 | Calagans | 244/103 W |
|---|---|---|---|
| 2,350,608 | 6/1944 | Griffith | 244/49 |
| 2,392,439 | 1/1946 | Wallace | 244/50 |
| 2,396,189 | 3/1946 | Millar | 244/100 R |
| 2,448,862 | 12/1944 | Pinardi et al. | 74/11 |
| 2,448,862 | 9/1948 | Conklin | 244/50 |
| 2,538,389 | 1/1951 | Smith | 244/103 R |
| 2,739,389 | 11/1954 | Scheidt | 33/134 |
| 2,777,655 | 1/1957 | Graham | 244/45 R |
| 2,794,608 | 6/1957 | Johnson | 244/102 R |
| 3,155,344 | 11/1964 | Vogt | 244/46 |
| 3,162,403 | 12/1964 | Hoke | 244/100 R |
| 3,244,385 | 4/1966 | Fehring et al. | 244/103 R |
| 3,261,574 | 7/1966 | Bowdy | 244/102 R |
| 3,285,541 | 11/1966 | Fehring et al. | 244/50 |
| 3,323,761 | 6/1967 | Copeland | 244/102 R |
| 3,443,674 | 5/1969 | Kornylak | 193/37 |
| 3,488,020 | 1/1970 | Scherer | 244/50 |
| 3,489,376 | 1/1970 | Steffen et al. | 244/50 |
| 3,511,456 | 5/1970 | Fehring et al. | 244/102 R |
| 3,516,625 | 6/1970 | Houser et al. | 244/50 |
| 3,687,400 | 8/1972 | Fitzgerald et al. | 244/102 R |
| 3,802,549 | 4/1974 | Kinsey | 198/165 |

Primary Examiner—Trygve M. Blix
Assistant Examiner—Galen L. Barefoot
Attorney, Agent, or Firm—Christensen, O'Connor, Garrison & Havelka

[57] ABSTRACT

The landing gear units for a high-wing aircraft are retractable into a single elongated carrier, which in turn revolves at a midpoint about a vertical axis in the fuselage. When deployed the carrier extends transversely outwardly from opposite sides of the fuselage to position the landing wheels in a transverse array. When stowed, with the wheels retracted into the carrier, the carrier is rotated into a longitudinal notch in the bottom of the fuselage.

8 Claims, 5 Drawing Figures

TURNOUT LANDING GEAR ARRAY CARRIER FOR HIGH-WING AIRCRAFT

BACKGROUND OF THE INVENTION

This application is a continuing application based on a prior copending application, Ser. No. 451,947, filed Mar. 18, 1974, now abandoned, the benefit of the filing date of which is hereby claimed under 35 U.S.C. 120.

This invention relates to aircraft landing gear and, more particularly, to fuselage mounted multiple unit array landing gear support systems such as are useful in large, fast, high-wing aircraft. The invention is herein illustratively described by reference to the presently preferred embodiment of the invention; however, it will be recognized that certain modifications and changes therein with respect to details may be made without departing from the essential features involved and that the principles may be applied to various types of aircraft.

A highspeed aircraft with its wings mounted high on the fuselage is subject to large overturning moments when maneuvering on the ground. To provide adequate lateral stability on the ground, a wide track landing gear is desirable and if the aircraft is very heavy, it is desirable to distribute the load on a number of wheel units. A preferred configuration or arrangement of the main landing gear wheel units is an elongated array extending transversely to the fuselage and outwardly from opposite sides thereof. However, the bulk and extended spread of the array is such that mounting and stowage of all of the wheel units becomes a problem due in part to the high placement of the wings and also to the usual narrowness of the fuselage already crowded with other equipment. In stowing the wheel units it is desirable to avoid large external protuberances or blisters which degrade the aerodynamic efficiency during flight. Additionally, economical considerations are involved as are such factors as strength, rigidity, reliability, compatability with take-off and landing flight characteristics (e.g. cross wind landing capability) of the aircraft, and ease of deployment and retraction.

It is therefore a broad object of this invention to provide a multiple unit array carrier system which generally solves the above-mentioned problems and overcomes certain difficulties of prior art devices relating to multiple landing gear unit retractable mounting arrangements.

Another object hereof is to provide a composite landing gear system which is stowed conveniently in the fuselage of the aircraft wherein the fairing of external configuration of the fuselage will not be disturbed or substantially modified. A related object is to devise such a system which can accommodate any desired number of wheel units likely to be necessary for different aircraft.

A specific object hereof is to provide an improved aircraft retractable landing gear of the wide track laterally extending array type, all parts of which may be stowed conveniently entirely inside the basic aircraft fuselage and without necessity of materially altering the exterior configuration of the latter.

A further object of this invention is to devise a common support carrier for the arrayed units of a multiple landing gear unit system, the retraction and deployment of which may be accomplished without undue force requirements, owing to the aerodynamic balancing of the resisting and driving couples or torques required and encountered during deployment and retraction. As will be seen, such balance is achieved by pivotally mounting the carrier at a midpoint so that the forces tend to equalize. A related object is to utilize such a pivotal mounting to provide an aircraft equipped with the carrier with improved cross wind landing capability.

SUMMARY OF THE INVENTION

In accordance with the invention, the retractable landing wheels and support struts of the main gear are mounted and housed in a linear array by means of a carrier which in turn is mounted in the fuselage to revolve on a vertical axis intermediate the ends of the carrier. To be deployed for landing, the carrier is rotated from its stowed position parallel to the aircraft longitudinal axis into a position extending transversely outwardly from opposite sides thereof. The strut mounted wheels then are lowered out of the carrier to form the desired landing wheel array. One, two, or more such arrays or other landing gear associated with the main array and spaced therefrom lengthwise of the fuselage may be used depending upon weight load and load distribution requirements.

Preferably, the aircraft fuselage underside or belly is notched to receive the carrier within it when stowed. A cover comprising part of the carrier or part of the fuselage may then be actuated to provide a closure which is essentially faired with or conformed to the exterior surface configuration of the fuselage.

These and other features, objects and advantages of the invention will become fully evident from the following description thereof by reference to the accompanying drawings.

DETAILED DESCRIPTION OF THE DRAWINGS

Figure 1:
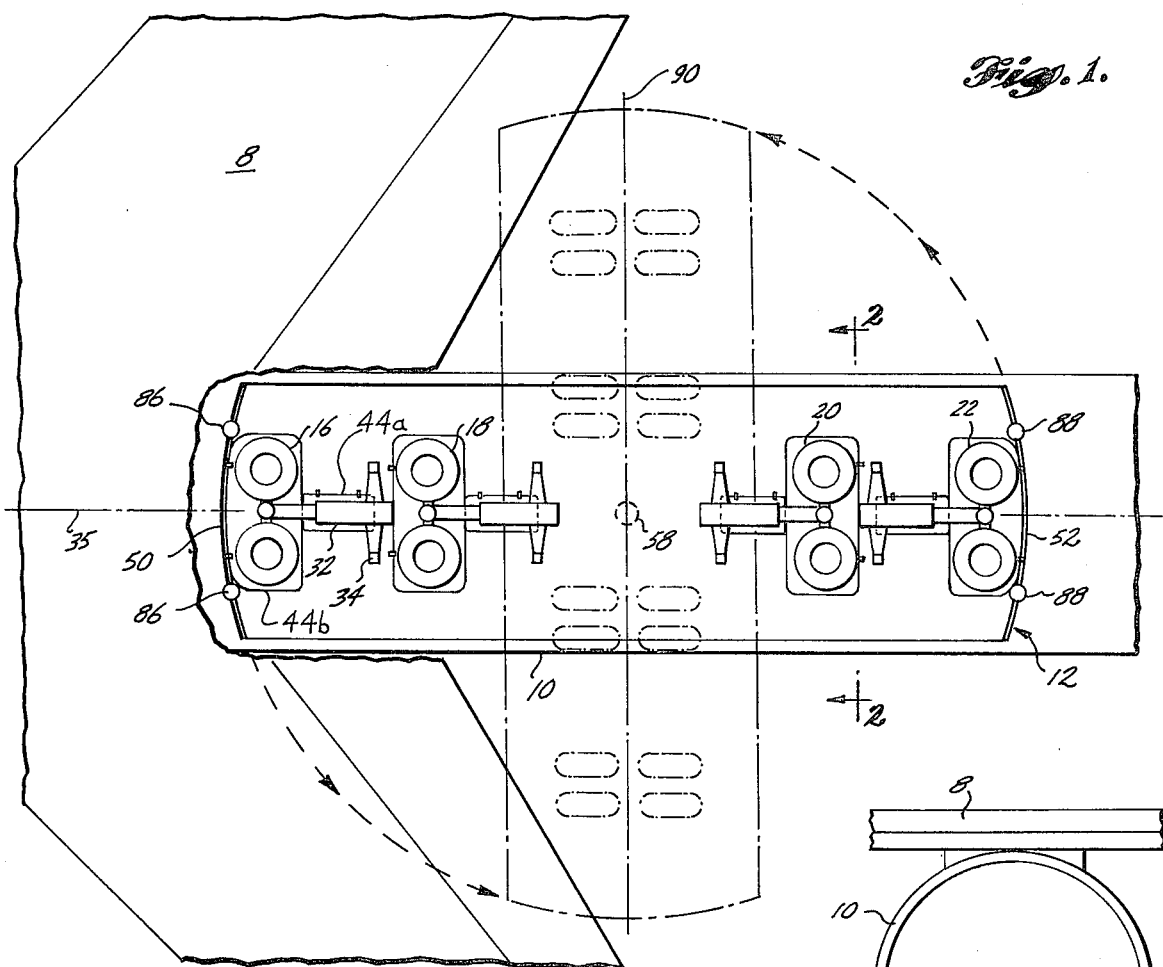
FIG. 1 is a partially broken away plan view of an aircraft landing gear installation incorporating the improved landing gear shown in solid lines stowed for flight and in broken lines deployed for landing.

In the drawings, like parts bear like reference numerals. The illustrated aircraft has fixed, high wings 8 and a fuselage 10 which carries the landing gear assembly including the elongated carrier 12. The carrier serves as a common support for the main landing gear bogies 16, 18, 20, 22, each of which comprises a strut mounted truck with a four-wheel cluster. In its deployed position extending transversely of the fuselage and with the opposite wheel carrying ends thereof extending outwardly from respectively opposite sides of the fuselage, the elongated carrier provides a supporting base and housing for the retractable wheel units.

The latter are spread out lengthwise of the carrier in a linear array affording adequate lateral stability in relation to the high center of gravity 14 of the aircraft. Moreover, with the carrier in the landing position close to the ground and substantially parallel to the ground, the individual struts for the multiple wheel bogies may all be short and of simple, relatively lightweight design.

As a housing into which the individual landing gear units are retractable, carrier 12 is divided into a series of spaces or compartments 24, 26, 28, and 30 for receiving the respective bogies or wheel clusters 16, 18, 20 and 22 and their associated struts 32. In the example, each strut 32 is mounted to swing upwardly into its retracted position on an axis defined by a support shaft 34 extending transversely the length of the carrier 12, hence, parallel to the aircraft longitudinal axis 35 with the carrier deployed for landing.

The wheel well compartments are generally similar. For example, compartment 28, which receives the right inboard wheel cluster 20, is defined by spaced vertical walls 41 and 43 extending lengthwise of the carrier on opposite sides thereof with a spacing sufficient to accommodate the wheel cluster 20. Vertical partitions 45 and 46 are spaced to accommodate the longitudinal dimension of the landing unit stowed in compartment 28. The transverse bulkheads or partitions in the elongated carrier structure provide stiffening and augment support for the retractable wheel units which in the example swing upwardly in the outward direction for retraction when the carrier is disposed transversely to the fuselage.

Figure 2:
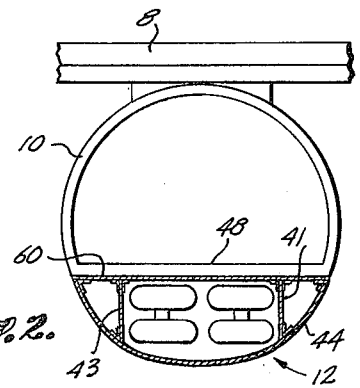
FIG. 2 is a transverse vertical section taken on line 2—2 in FIG. 1.
Figure 3:
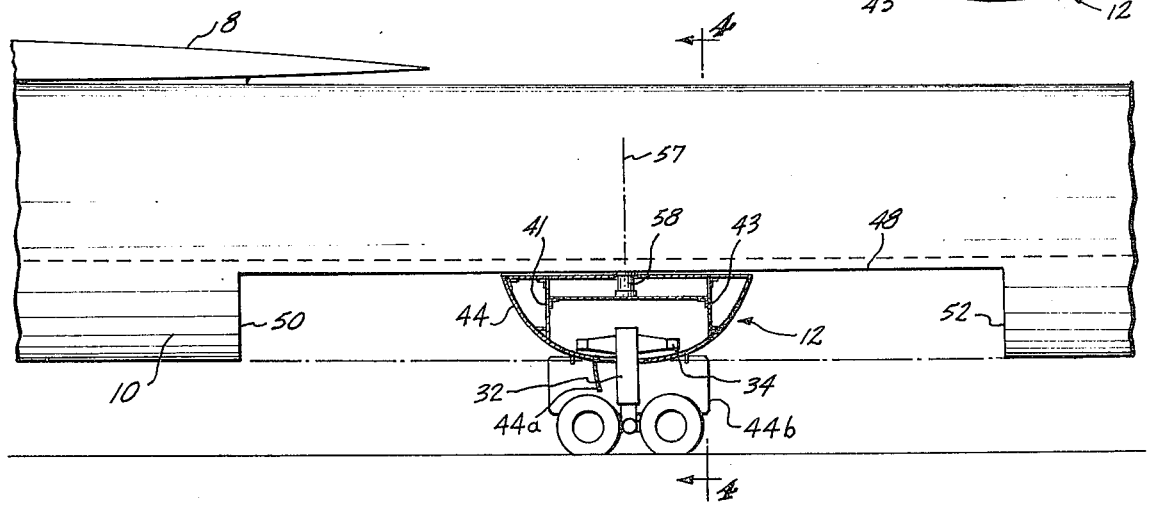
FIG. 3 is a transverse vertical section taken along line 3—3 in FIG. 4 of the mid-portion of an airplane supported on the ground by the improved landing gear.
Figure 4:
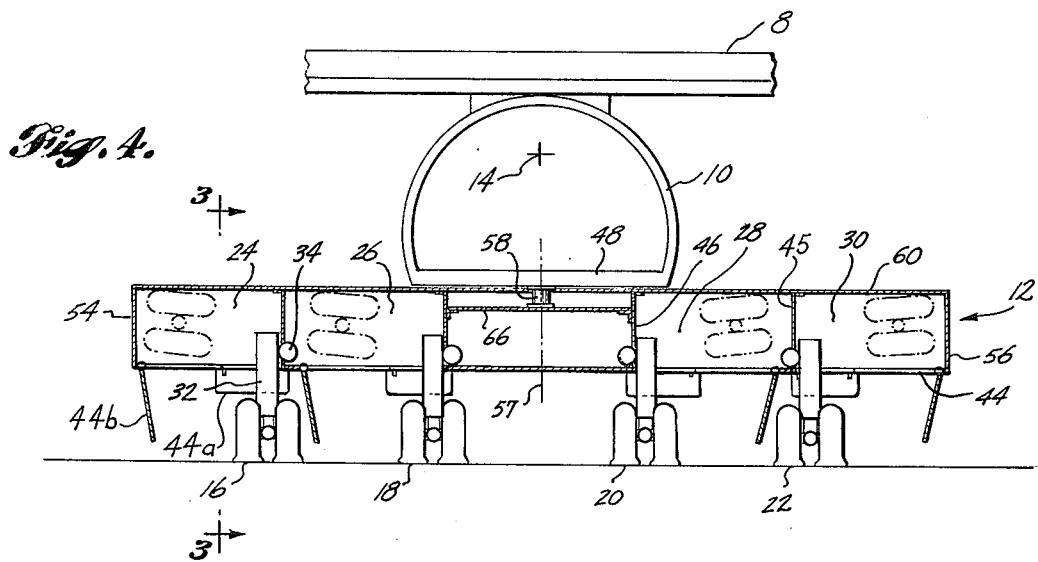
FIG. 4 is a transverse vertical section taken on line 4—4 in FIG. 3 showing the landing gear carrier extended and with the wheels shown in solid lines engaging the ground and in broken lines retracted.

In its stowed position, the elongate dimension of the carrier aligns with the longitudinal dimension of the aircraft fuselage. The underside of the fuselage is notched to accommodate the carrier in its retracted position as depicted in FIGS. 1, 2, and 3, the notch end walls being formed by the bulkheads 50 and 52 and the notch top wall being defined by the cargo or passenger floor 48. The carrier cover 44 conforms the carrier in its nested position in the notch to the shape of the fuselage, thus fairing it into the fuselage. The cover 44 is sectionalized to form small doors 44a associated with each strut 32 and large doors 44b associated with each wheel cluster. The small doors 44a are hinged longitudinally and the large doors 44b are hinged transversely of the carrier, as shown (FIG. 1), and extend, respectively, perpendicularly and parallel to the aircraft longitudinal axis with the carrier deployed for landing. It will be appreciated that drag is minimized by thusly positioning the doors during takeoff and landing. The doors are suitably adjusted by means not shown so as to open and close the bottom of the carrier when the wheel units are to be extended or are in stowed position. Actuating and supporting mechanism for these doors may be of any suitable or conventional design. The carrier end walls 54 and 56 are of convex circular arcuate form concentric to the carrier's upright pivot axis 57 defined by the "king pin" pivotal support 58. The fuselage notch transverse end walls 50 and 52 are of similar arcuate form providing clearance at close spacing between the fuselage cavity end walls and carrier end walls. As a housing for the landing gear units the carrier defines an enclosure consisting of the sectionalized exterior bottom panel 44, the end panels 54 and 56 and a flat top panel 60 underlying the cargo or passenger floor of the fuselage interior.

Figure 5:
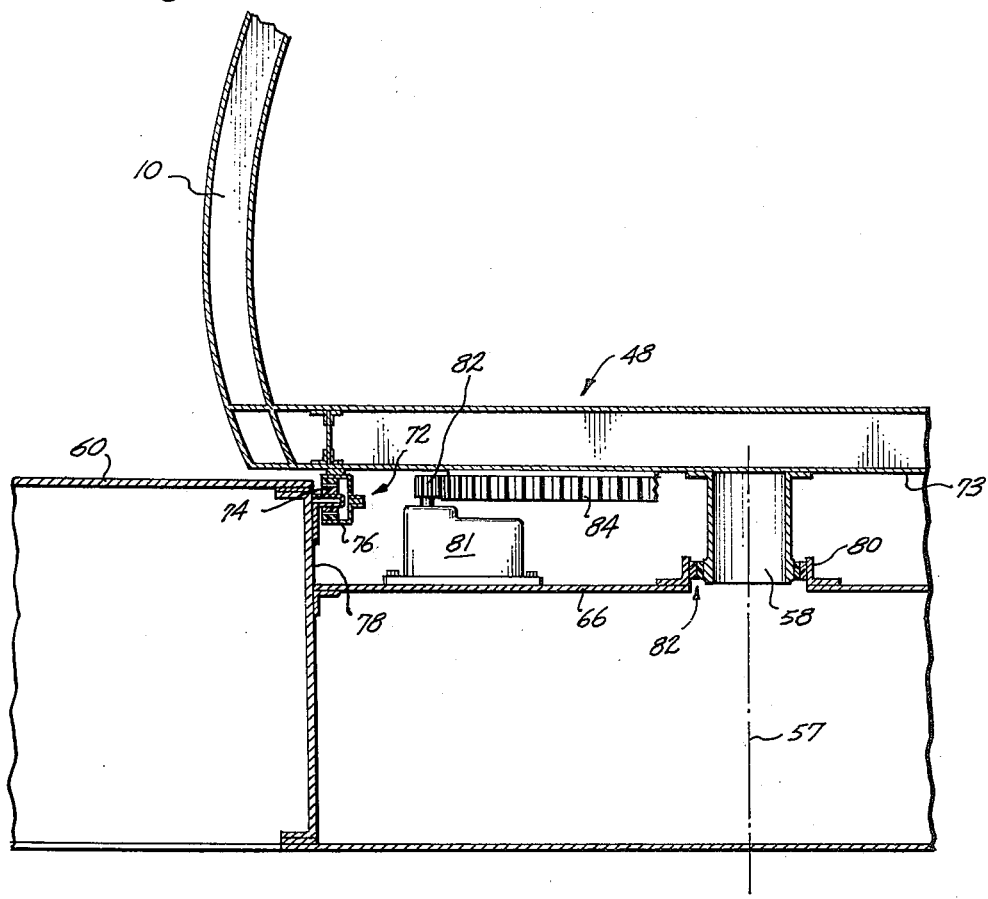
FIG. 5 illustrates on an expanded scale and in somewhat more detail the left center portion of the landing gear carrier and aircraft fuselage portion depicted in FIG. 4.

In addition to the central vertical support pivot 58 rotatively supporting the carrier in the fuselage structure, bearing support is provided by an annular ring bearing 72 of maximum diameter attainable within the confines of the fuselage cavity or notch in which the carrier is accommodated. Along with the upper portion of the center pivots 58, this outer annular bearing assembly 72 is supported from the fuselage by the floor structural members 48 and bottom panels 73 joined thereto. Bearing assembly 72 comprises an annular bearing ring 74 on the carrier and an underlying bearing ring 76 dependingly mounted in the fuselage structure. The carrier bearing ring 74 in turn is mounted on a cylindrical wall 78 is the carrier. Roller elements or other anti-friction means may be interposed between the rings 74 and 76 as required. Pivot 58 fixed in a depending position from the fuselage structure is collared within a ring 80. Anti-friction elements such as rollers are interposed between the pivot shaft 58 and the ring 80 to form an anti-friction bearing 82. Bearing ring 80 in turn is supported by a horizontal panel 66 which also serves as a support for the drive motor 81 which turns a pinion 82 engaging a ring gear 84 fixed to the fuselage floor panel 73 as shown (FIG. 5). Suitable anti-friction elements may be employed in bearings 72 and 82, as an alternative to bearing rollers, such as teflon rings which have low friction and suitable wear characteristics. The carrier may be locked in the stowed position by forward and rear pairs of keel beam locks 86 and 88. With drive motor 81 energized in one direction or the other to rotate the pinion 82, the carrier may be turned through 90° about vertical axis 57 in order to revolve it between its stowed position nestled conformably in the fuselage and its deployed position extending at right angles thereto. By turning the carrier more or less than 90° during landing, it also is possible to compensate for angular deviations of the aircraft due to cross wind.

It will be recognized that the details of the supporting and driving apparatus for rotating the carrier between the landing and storage positions may vary and that other types of driving apparatus and coupling arrangements may be employed.

In operation, the landing gear is made ready for landing by rotating the carrier from its nested position in the fuselage into landing position wherein the carrier's longitudinal axis 90 is generally perpendicular to the centerline 35 of the aircraft fuselage. Upon reaching its landing position, the panel doors 44a and 44b are opened and the landing gear wheel clusters are lowered on the support shafts 34. In reverse manner, with the airplane off the ground, the landing gear is stowed by retracting the wheel clusters into the carrier, closing the doors 44a and 44b, and rotating the carrier into the fuselage cavity.

The turnout landing gear carrier is described herein in connection with the main landing gear of a high wing aircraft. It is possible, however, to employ a similar carrier arrangement for the nose gear as well. Further, the carrier may be employed on other types of aircraft where multiple unit arrays of landing wheels are employed. These and other modifications and applications of the invention will be evident to those skilled in the art of aircraft landing gear design.

What is claimed is:

1. A retractable aircraft landing gear system comprising:
    an elongated boom-like carrier mounted on an aircraft fuselage, said fuselage and said carrier having longitudinal dimensions, the longitudinal dimension of said carrier extending transversely outwardly from opposite sides of said fuselage and being oriented in a substantially horizontal plane when said carrier is in a landing position,
a plurality of individual landing gear units retractively mounted in the carrier at intervals spaced along the longitudinal dimension thereof and in an array extending outwardly from both sides of the fuselage when the carrier is in a landing position, the individual landing gear units mounted on the carrier being supported by pivotal mountings defining axes extending transversely to the longitudinal dimension of the carrier,
pivot means on the fuselage rotatably supporting the carrier intermediate its ends to turn about a vertical axis relative to the fuselage from said landing position into a retractive position wherein the longitudinal dimension of the carrier is oriented substantially parallel with the longitudinal dimension of the fuselage, the pivot means including an annular ring bearing on the fuselage and a cooperative ring bearing on the carrier, each of said bearings having a diameter representing a major portion of the width of the fuselage at the location therein of the ring bearings, and means associated with the carrier and fuselage to fair the same together for reduction of drag during flight, the fuselage being recessed to accommodate the carrier within the outline thereof when the carrier is in its retractive position.

2. A landing gear system for supporting an aircraft fuselage, said fuselage having fixed wings mounted thereon at a location high on said fuselage, said landing gear system comprising:
an elongated multi-unit landing gear carrier,
means mounting the carrier intermediate its ends on the aircraft fuselage below the location of and separate from said wings for rotation about a vertical axis relative to said fuselage,
a plurality of individual landing gear units,
means retractively mounting the landing gear units on the carrier at intervals spaced along the lengthwise dimension of the carrier, and
means for rotatably driving the carrier about the vertical axis between a retracted position wherein the lengthwise dimension of the carrier extends parallel to the lengthwise dimension of the fuselage and a deployed position wherein the lengthwise dimension of the carrier is oriented transversely to the lengthwise dimension of the fuselage and extends outwardly beyond the sides of the fuselage,
said carrier being rotatably mounted in the fuselage by a central pivot connection between the carrier and the aircraft fuselage and by annular bearing means of relatively large diameter concentrically surrounding the central pivot and including cooperating annular members respectively mounted on the fuselage and on the carrier.

3. A landing gear system for supporting an aircraft fuselage, said fuselage having fixed wings mounted thereon at a location high on said fuselage, said landing gear system comprising:
an elongated multi-unit landing gear carrier,
means mounting the carrier intermediate its ends on the aircraft fuselage below the location of and separately from said wings for rotation about a vertical axis relative to said fuselage,
a plurality of individual landing gear units,
means retractively mounting the landing gear units on the carrier at intervals spaced along the lengthwise dimension of the carrier, at least one of said landing gear units being mounted at a location adjacent each of the ends of said carrier,
means for rotatably driving the carrier about the vertical axis between a retracted position wherein the lengthwise dimension of the carrier extends parallel to the lengthwise dimension of the fuselage and a deployed position wherein the lengthwise dimension of the carrier is oriented transversely to the lengthwise dimension of the fuselage and extends outwardly beyond the sides of the fuselage, at least one of said landing gear units mounted adjacent the ends of said carrier being positioned outwardly beyond the sides of said fuselage when said carrier is in a deployed position, and
means defining a housing for enclosing the retracted landing gear units therein including cover means fairing the carrier with the fuselage when the carrier is in its retracted position and when the landing gear units are retracted within the carrier, said cover means being so constructed and associated with said carrier to conform the shape of said carrier to the shape of said fuselage when in its retracted position.

4. The landing gear defined in claim 3 wherein each landing gear unit is retractively pivoted on a horizontal member mounted on said carrier within said housing, said horizontal member defining a pivot axis perpendicular to the lengthwise dimension of the carrier.

5. The landing gear defined in claim 3 wherein the fuselage has an underside notch therein shaped to receive the carrier in its retracted position and wherein said carrier is sectionalized to provide doors that are mounted to open and close for passing the landing gear units therethrough when moving between their retracted and extended positions.

6. In an aircraft having a fuselage and fixed wings mounted high on said fuselage, said fuselage having sides, a bottom portion, and a longitudinal axis, the improvement comprising:
a landing gear carrier having an elongate dimension and means mounting said carrier to the bottom portion of said fuselage for rotation about a vertical axis intersecting said fuselage, said carrier having first and second ends, said carrier including means for housing landing gear therein,
a landing gear including a strut and a wheel mounted for rotation on said strut, and means mounting said landing gear on said carrier for retractive movement to and from said means for housing said landing gear,
means for rotating said carrier about said vertical axis between a first position wherein the elongate dimension of said carrier is oriented substantially parallel with the longitudinal axis of said fuselage and a second position wherein the elongate dimension of said carrier is oriented transversely relative to the longitudinal axis of said fuselage and wherein said wheel is located transversely outwardly from a side of said aircraft when said carrier is in said second position,
means defining an upwardly extending recess in said fuselage for receiving said carrier when in its first position, and
cover means associated with said carrier and said fuselage for conforming the shape of said carrier to the shape of said fuselage when in its first position nested in said recess.

7. In the aircraft of claim 6 wherein said means mounting said landing gear on said carrier mounts said gear for swinging, retractive movement about an axis oriented transversely to said vertical axis and to the elongate dimension of said carrier.

8. In the aircraft of claim 6 wherein said vertical axis is centrally located along the elongate dimension of said carrier, the improvement further comprising:

a plurality of landing gears, each including a strut and a wheel mounted for rotation on said strut, and means mounting said plurality of landing gears on said carrier for retractive movement to and from said means for housing landing gear, said wheels being located transversely outwardly from the sides of said fuselage when said carrier is in said second position.

* * * * *